US012484480B2

(12) United States Patent
Rossi et al.

(10) Patent No.: US 12,484,480 B2
(45) Date of Patent: Dec. 2, 2025

(54) ROBOTIC GRIPPER HARVESTING SYSTEM, AND METHODS OF HARVESTING PRODUCE

(71) Applicant: Fresh BioSystems, LLC, Aptos, CA (US)

(72) Inventors: Robert J. Rossi, Carmel, CA (US); David B. Rossi, Aptos, CA (US)

(73) Assignee: Fresh BioSystems, LLC, Aptos, CA (US)

( * ) Notice: Subject to any disclaimer, the term of this patent is extended or adjusted under 35 U.S.C. 154(b) by 576 days.

(21) Appl. No.: 17/790,439

(22) PCT Filed: Jan. 6, 2021

(86) PCT No.: PCT/US2021/012263
§ 371 (c)(1),
(2) Date: Jun. 30, 2022

(87) PCT Pub. No.: WO2021/141954
PCT Pub. Date: Jul. 15, 2021

(65) Prior Publication Data
US 2023/0037608 A1 Feb. 9, 2023

Related U.S. Application Data

(60) Provisional application No. 62/957,697, filed on Jan. 6, 2020.

(51) Int. Cl.
*A01D 45/26* (2006.01)
*A01D 46/30* (2006.01)

(52) U.S. Cl.
CPC ........... *A01D 45/263* (2013.01); *A01D 46/30* (2013.01)

(58) Field of Classification Search
CPC .... A01D 45/263; A01D 46/30; A01D 46/253; A23N 15/003; B25J 15/0061;
(Continued)

(56) References Cited

U.S. PATENT DOCUMENTS

| | | | |
|---|---|---|---|
| 5,074,203 A | * | 12/1991 | Hirtle ................... A23N 15/003 99/638 |
| 8,272,200 B1 | * | 9/2012 | Ottaway .............. A01D 45/263 56/327.1 |

(Continued)

FOREIGN PATENT DOCUMENTS

| | | |
|---|---|---|
| CN | 203896767 U | 10/2014 |
| CN | 107409634 A | 12/2017 |

(Continued)

OTHER PUBLICATIONS

CN 109168636 A—English translation (Year: 2019).*

(Continued)

*Primary Examiner* — Joseph M Rocca
*Assistant Examiner* — Julia C Tran
(74) *Attorney, Agent, or Firm* — Morrison & Foerster LLP

(57) ABSTRACT

An exemplary harvester comprises a cutting and gripping unit, comprising: a top frame; a base ring structure; a plurality of supports arranged in a circular configuration to form a cage-like structure, wherein proximal ends of the plurality of supports are affixed to the top frame and distal ends of the plurality of supports are affixed to the base ring structure; a set of grippers connected to the top frame; a blade rotatably connected to the base ring structure, wherein the blade is configured to cut the produce while at least a part of the produce is enclosed within the plurality of supports and secured by the set of grippers.

17 Claims, 11 Drawing Sheets

(58) Field of Classification Search
CPC ............. B25J 15/0206; B25J 15/0253; B25J 15/0293; B25J 15/12; B25J 15/0009
See application file for complete search history.

(56) References Cited

U.S. PATENT DOCUMENTS

| | | | |
|---|---|---|---|
| 8,306,663 B2 | 11/2012 | Wickham | |
| 8,381,501 B2 * | 2/2013 | Koselka | A01D 91/00 |
| | | | 701/50 |
| 2004/0187467 A1 * | 9/2004 | Garcia, Jr. | A23N 15/003 |
| | | | 56/328.1 |
| 2010/0292841 A1 * | 11/2010 | Wickham | B25J 15/0206 |
| | | | 700/259 |
| 2011/0137456 A1 * | 6/2011 | Koselka | G05D 1/021 |
| | | | 701/532 |
| 2016/0073584 A1 * | 3/2016 | Davidson | A01D 46/30 |
| | | | 294/198 |
| 2018/0035611 A1 * | 2/2018 | D'Arrigo | A01D 45/263 |
| 2019/0029178 A1 * | 1/2019 | Russel | A01D 46/30 |
| 2019/0053430 A1 * | 2/2019 | Molenaar | A01D 45/26 |
| 2020/0281122 A1 * | 9/2020 | Mor | A01F 15/00 |
| 2020/0323140 A1 * | 10/2020 | Gielis | A01D 46/24 |
| 2021/0368686 A1 * | 12/2021 | Wisdom | B25J 9/1697 |
| 2022/0007582 A1 * | 1/2022 | Lapalme | B65G 61/00 |

FOREIGN PATENT DOCUMENTS

| | | | | |
|---|---|---|---|---|
| CN | 107926290 A | | 4/2018 | |
| CN | 109168636 A | * | 1/2019 | ............. A01D 46/30 |
| EP | 1621062 A1 | | 2/2006 | |
| WO | WO-2019049130 A1 | | 3/2019 | |
| WO | WO-2020076616 A1 | | 4/2020 | |

OTHER PUBLICATIONS

International Search Report and Written Opinion received for International Patent Application No. PCT/US2021/012263 mailed on Mar. 8, 2021, 13 pages.

International Search Report and Written Opinion received for International Patent Application No. PCT/US2021/012263 mailed on Apr. 2, 2021, 13 pages.

Extended European Search Report and Written Opinion received for European Patent Application No. 21738072.4 mailed on Jan. 3, 2024, 11 pages.

* cited by examiner

300

---

302
DETERMINING A LOCATION OF A PRODUCE

304
MOVING, VIA A ROBOTIC ARM, A CUTTING AND GRIPPING UNIT OVER THE PRODUCE BASED ON THE DETERMINED LOCATION

306
LOWERING THE CUTTING AND GRIPPING UNIT

308
ACTUATING A SET OF GRIPPERS OF THE CUTTING AND GRIPPING UNIT TO GRAB THE PRODUCE

310
ACTUATING A MOTOR TO DRIVE A BLADE OF THE CUTTING AND GRIPPING UNIT TO CUT THE STEM OF THE PRODUCE WHILE THE PRODUCE IS SECURED BY THE GRIPPERS

FIG. 3

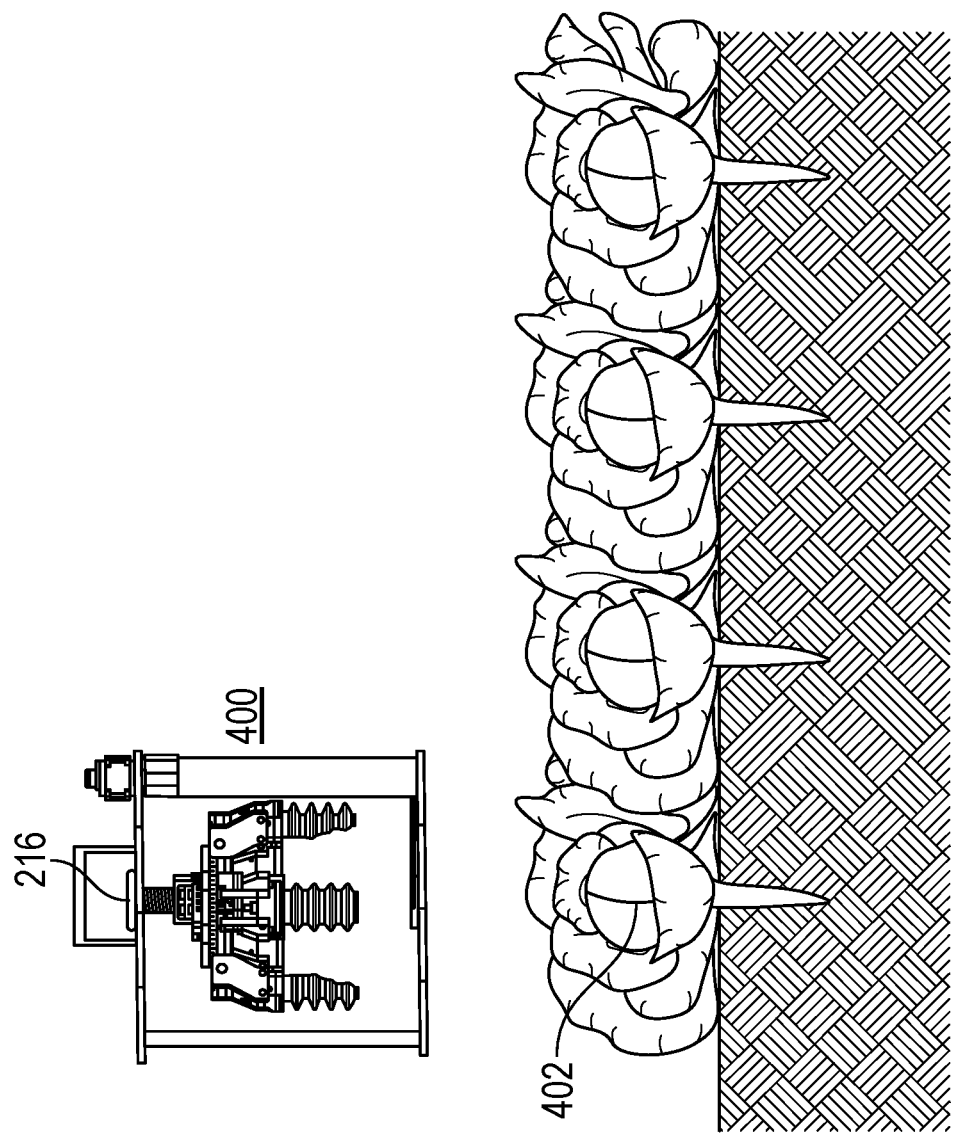

ROBOTIC GRIPPER HARVESTING SYSTEM, AND METHODS OF HARVESTING PRODUCE

CROSS REFERENCE TO RELATED APPLICATIONS

This application is a national stage application under 35 U.S.C. § 371 of International Application No. PCT/US2021/012263, filed internationally on Jan. 6, 2021, which claims priority to U.S. Provisional Patent Application No. 62/957,697, filed Jan. 6, 2020, which are incorporated herein by reference in their entirety.

FIELD

The present disclosure relates generally to mechanically harvesting agricultural produce and, more particularly, to robotic mechanisms and techniques for harvesting produce planted in a field (e.g., iceberg lettuce, romaine lettuce, broccoli, cabbage, and any round or domed fruit or vegetable).

BACKGROUND

Conventional harvesters do not provide a fully automated, precise, and adaptable solution. Many harvesters are designed to support or complement manual labor, rather than to automate the harvesting process (e.g., identifying the location of a produce, properly positioning the produce, cutting the proper part of the produce, transporting the produce) in a precise and streamlined manner. Further, many harvesters are designed to handle only a specific produce type. For example, a conventional lettuce harvester cannot be used to harvest other produce types such as broccoli.

BRIEF SUMMARY

Disclosed herein are exemplary harvesters that can be automatic, precise, and adaptable to a wide variety of produce types. The harvesters can be configured to harvest any vegetable or fruit that predominantly has a round or domed shape (e.g., lettuce, cabbage, cauliflower, broccoli, and artichoke, Brussel sprouts). The harvesters can significantly improve food safety standards, by reducing the amount of people, personal vehicles, and portable restrooms in the fields, while dramatically reducing labor and associated cost in the harvesting process.

In some aspects, provided is an exemplary harvester for harvesting a produce planted in a field comprises a cutting and gripping unit, comprising: a top frame; a base ring structure; a plurality of supports arranged in a circular configuration to form a cage-like structure, wherein proximal ends of the plurality of supports are affixed to the top frame and distal ends of the plurality of supports are affixed to the base ring structure; a set of grippers connected to the top frame; and a blade rotatably connected to the base ring structure, wherein the blade is configured to cut the produce while at least a part of the produce is enclosed within the plurality of supports and secured by the set of grippers.

In some embodiments, the harvester further comprises a motor configured to drive the blade to cut the produce.

In some embodiments, the harvester further comprises a robotic arm configured to move the cutting and gripping unit.

In some embodiments, the harvester further comprises a vision unit, wherein the vision unit comprises at least one camera, and wherein the harvester is configured to position the cutting and gripper unit over the produce via the robotic arm.

In some embodiments, the harvester further comprises a control unit configured to actuate the set of gripers and the blade.

In some embodiments, the harvester further comprises a conveyor unit configured to transport the harvested produce to a packaging area.

In some embodiments, the harvester further comprises a chassis, wherein the cutting and gripping unit is connected to the chassis.

In other aspects, provided is an exemplary method for harvesting a produce planted in a field using the harvester described herein. In some embodiments, the method comprises determining a location of the produce; positioning the harvester based on the determined location of the produce; lowering the harvester to enclose at least a portion of the produce within the plurality of supports; securing the produce via the set of grippers; and activating the blade to cut the produce while the produce is secured via the set of grippers.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 3 illustrates an exemplary process for harvesting produce planted in a field, according to some embodiments.

FIGS. 4A-4C, 5A-5B, 6A-6B, 7A-7C illustrate different views of exemplary harvesters operating in the field, according to some embodiments.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

In some aspects, provided herein is a harvester that includes several integrated units, operating together to harvest produce that is planted in a field. In some embodiments, the integrated units include (1) a cutting mechanism, such as a blade, to cut the produce planted in a field, (2) a cage-like structure comprising robotic grippers to hold the cut produce, (3) a robotic arm to position the cutting mechanism and the cage-like structure, (4) a vision unit that includes one or more image sensors (e.g., a camera) and software to identify produce to be harvested, and (5) a control unit that coordinates the various aforementioned units. In some variations, the harvester further includes a chassis to which the aforementioned units are connected. In one variation, the chassis is a base framework of a motor vehicle or other wheeled conveyance. In certain variations, the harvester further includes a conveyor unit to transport the harvested produce to a storage area or a processing area (e.g., washing station, packaging station).

Figure 1:
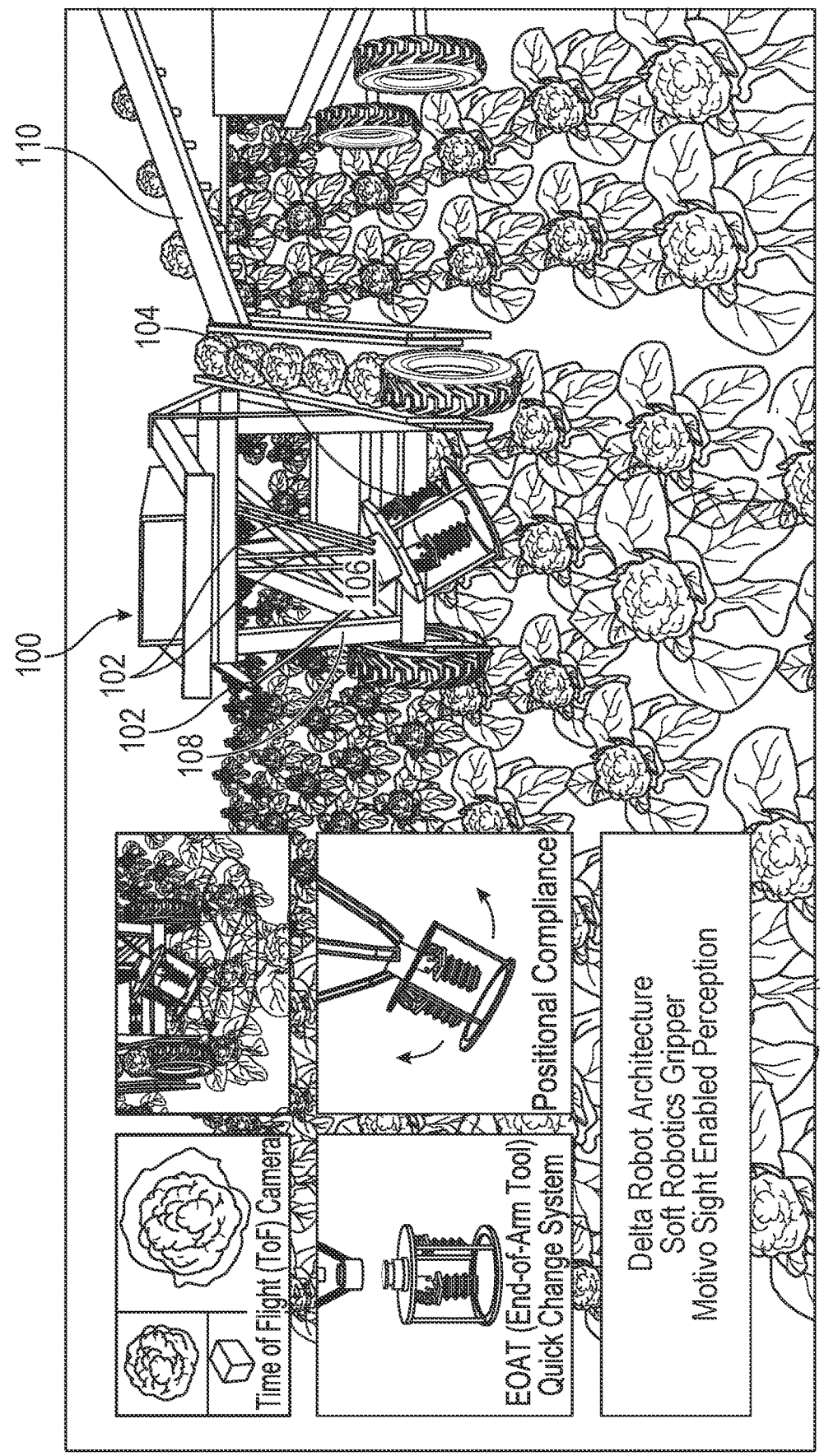
FIG. 1 illustrates an exemplary harvester, according to some embodiments.

FIG. 1 illustrates one view of an exemplary harvester 100 operating in a field of lettuce, according to some embodiments. The harvester 100 comprises a set of robotic arms 102. In the depicted example, the set of robotic arms 102 has a robot configuration comprising a number of arms (e.g., three, four, or five arms) connected to universal joints at a base. The harvester 100 further comprises a cutting and gripping unit 104. The cutting and gripping unit 104 is attached to the distal end 106 of the set of robotic arms 102. In some embodiments, one or more arms of the set of robotic arms 102 may be hollow such that they are more lightweight and require less material to manufacture, while retaining rigidity and providing support for the cutting and gripping unit 104. In the depicted example, the set of robotic arms 102 has a delta robot configuration comprising three arms, but it should be appreciated that the robotic arms can have any configuration with any number of arms.

The harvester 100 further comprises a chassis 108. The chassis 108 supports the set of robotic arms 102. In some embodiments, the harvester 100 further comprises a conveyor unit 110. In some embodiments, after severing a produce head from the root, the set of robotic arms 102 can deposit the harvested produce head onto the conveyor unit 110. As depicted, the conveyor unit 110 comprises a conveyor belt to transport the harvested produce from the harvester to a storage area or a processing area (e.g., a washing station, a packaging station). The conveyor belt can comprise a plurality of compartments and each compartment can be configured to hold a single harvested produce as the produce is transported.

Figure 2B:
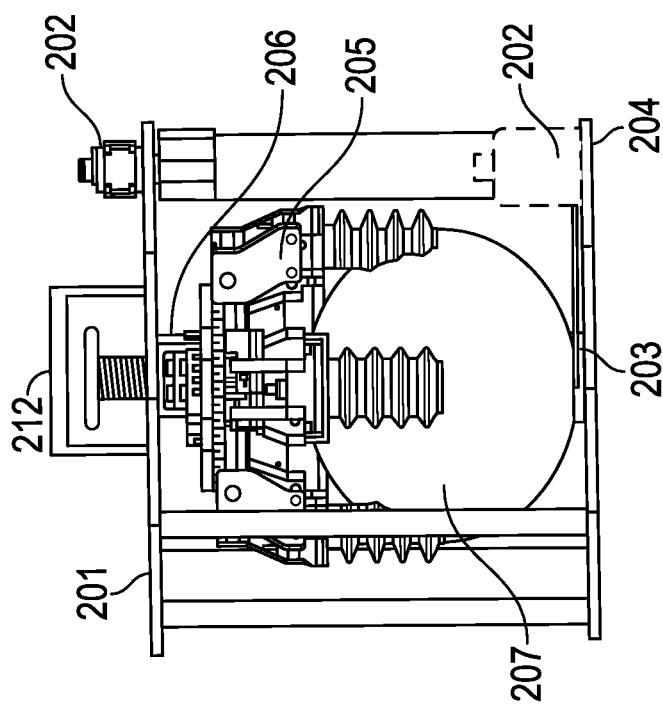
FIGS. 2A-2C illustrate various views of an exemplary cutting and gripping unit of a harvester, according to some embodiments.
Figure 2C:
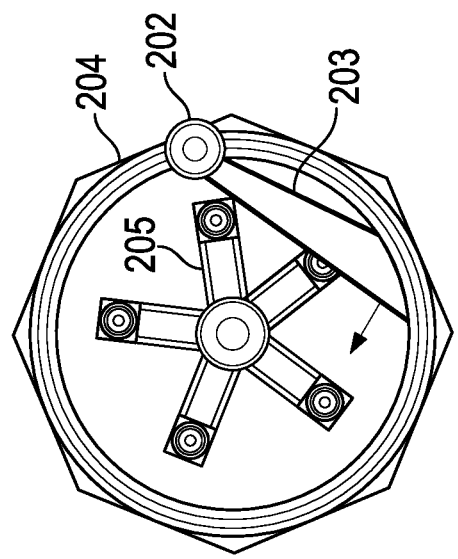
Figure 2A:
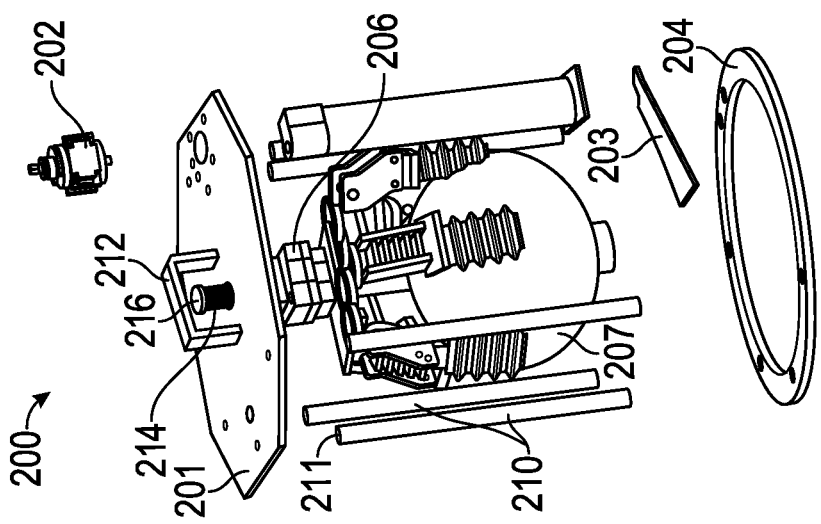

FIGS. 2A and 2B illustrate an exemplary cutting and gripping unit 200 (e.g., cutting and gripping unit 104 of FIG. 1), according to some embodiments. FIG. 2A depicts an exploded view of the cutting and gripping unit 200, and FIG. 2B depicts a side view of the cutting and gripping unit 200.

With reference to FIGS. 2A and 2B, the cutting and gripping unit comprises a top frame 201. In the depicted example, the top frame 201 is a flat metal slab. In some embodiments, the weight of the top frame 201 can be reduced by altering its shape, size, and/or material. For example, the top frame 201 may have a star-shape, include holes, and/or be hollow.

The cutting and gripping unit 200 further comprises a base ring structure 204. In some embodiments, the base ring structure 204 is on a plane that is parallel or substantially parallel (e.g., angle smaller than 10 degrees) to the plane of the top frame 201. In the depicted example, the base ring structure 204 is a flat metal ring. In some embodiments, the weight of the top frame 201 can be reduced by altering its shape, size, and/or material.

The cutting and gripping unit 200 further comprises a plurality of supports 210 connecting the top frame 201 and the base ring structure 204. The proximal ends 211 of the supports are affixed to the top frame 201, and the distal ends of the supports are affixed to the base ring structure 204. In the depicted example, the plurality of supports are perpendicular with respect to the surface of the frame and with respect to the plane of the ring structure.

Accordingly, the top frame 201, the base ring structure 204, and the plurality of supports 210 form a cage-like structure. A set of grippers 205 are enclosed in the cage-like structure. The set of grippers can comprise any number of grippers. In the depicted example, the set of grippers comprises five soft jaw grippers sharing a base. In operation, the set of soft jaw grippers is connected to top frame 201. Each gripper can independently extend and contract, so as to allow the set of grippers to work together to wrap around at least a portion of produce 207, as described below. In some variations, each gripper has a rubber mechanism that allows it to contact produce 207 in a way that minimizes damage to the produce. The size of the cage-like structure may be selected based on a type of produce 207 (e.g., broccoli, lettuce, etc.) to be harvested.

In some embodiments, the set of grippers 205 is allowed a range of vertical movement relative to top plate 201. Vertical freedom of movement of the set of grippers may be advantageous for multiple reasons: (1) to enhance mobility and flexibility of the set of grippers, thereby allowing gripping of different types of produce; and (2) to reduce the force applied to the produce when the set of grippers contacts the produce, thereby minimizing damage to the produce. With reference to FIG. 2A, the base of the set of grippers is connected to a shaft 214. The shaft passes through the top plate 201 via a hole in the top plate. The proximal end of the shaft comprises a stopper 216, which is enclosed in a bracket 212. The bracket 212 is affixed to the top plate 201. In operation, the bracket is connected to a set of robotic arms (e.g., set of robotic arms 102 of FIG. 1). Thus, movement of the robotic arms causes the top plate 201, and thus the cage-like structure, to move.

When the set of grippers 205 is not pushed against a produce, the weight of the grippers can cause the stopper to rest flush against the top plate. During harvesting, the cage-like structure, together with the set of grippers, is pushed downward toward a produce 207 by the robotic arm such that the set of grippers 205 comes into contact with the produce 207. The upward resistance force from the produce may cause the grippers to move vertically upward relative to the cage-like structure until the stopper 216 hits the bracket on the top frame 212. The vertical movement of the grippers will be explained further with respect to FIGS. 4A-4C.

The cutting and gripping unit 200 is also equipped with a camera 206. In some variations, the camera is positioned within the cage-like structure. As shown in FIGS. 2A and 2B, the camera is mounted at the center of the base of the set of grippers. In some embodiments, the camera is a time-of-flight camera.

The cutting and gripping unit 200 further comprises a cutting mechanism, such as a blade 203, and a motor 202. In some embodiments, the motor 202 is a rotary air motor. In the depicted example in FIG. 2A, the motor 202 is positioned above the top frame 201. As shown in FIG. 2B, the motor 202 alternatively can be positioned near or at the base ring structure 204 (e.g., affixed to the base of the ring structure 204). The motor may be configured to drive the blade 203 via a coupling mechanism (e.g., by rotating a shaft to which the blade is attached). Positioning the motor at or near the base ring, rather than on the top frame, may advantageously reduce power losses in the process of transmitting power from the motor to the blade.

With reference to FIGS. 2A-C, the proximal end of the blade 203 is mounted onto the base ring structure 204. The motor 202 can be located above the proximal end of the blade 203 either near the blade itself or over the top frame 201, as shown in FIG. 2B. The blade can be driven by the motor 202 to rotate along an axis perpendicular to the plane of the ring structure to cut the stem of a produce 207. FIG. 2C depicts a top view of the grippers 205 and the blade 203. The length of the blade can be selected such that the blade can cut produce located within the base ring structure 204 but does not extend beyond the base ring structure in some embodiments.

Turning back to FIG. 1, the harvester 100 further comprises mechanisms and techniques (e.g., software), including an end-of-arm quick change system, a positional compliance mechanism, and sight enabled perception.

FIG. 3 illustrates an exemplary process for harvesting produce planted in a field, according to some embodiments. In process 300, some steps are, optionally, combined, the order of some steps is, optionally, changed, and some steps are, optionally, omitted. In some examples, additional steps may be performed in combination with the process 300. Accordingly, the operations as illustrated (and described in greater detail below) are exemplary by nature and, as such, should not be viewed as limiting.

In step 302, the harvester has a vision unit (e.g., one or more image sensors such as a camera, software) that determines a location of a produce (e.g., produce 402 of FIG. 4A) planted in a field. In some embodiments, the harvester determines the location based on one or more images taken by a camera.

Figure 4C:
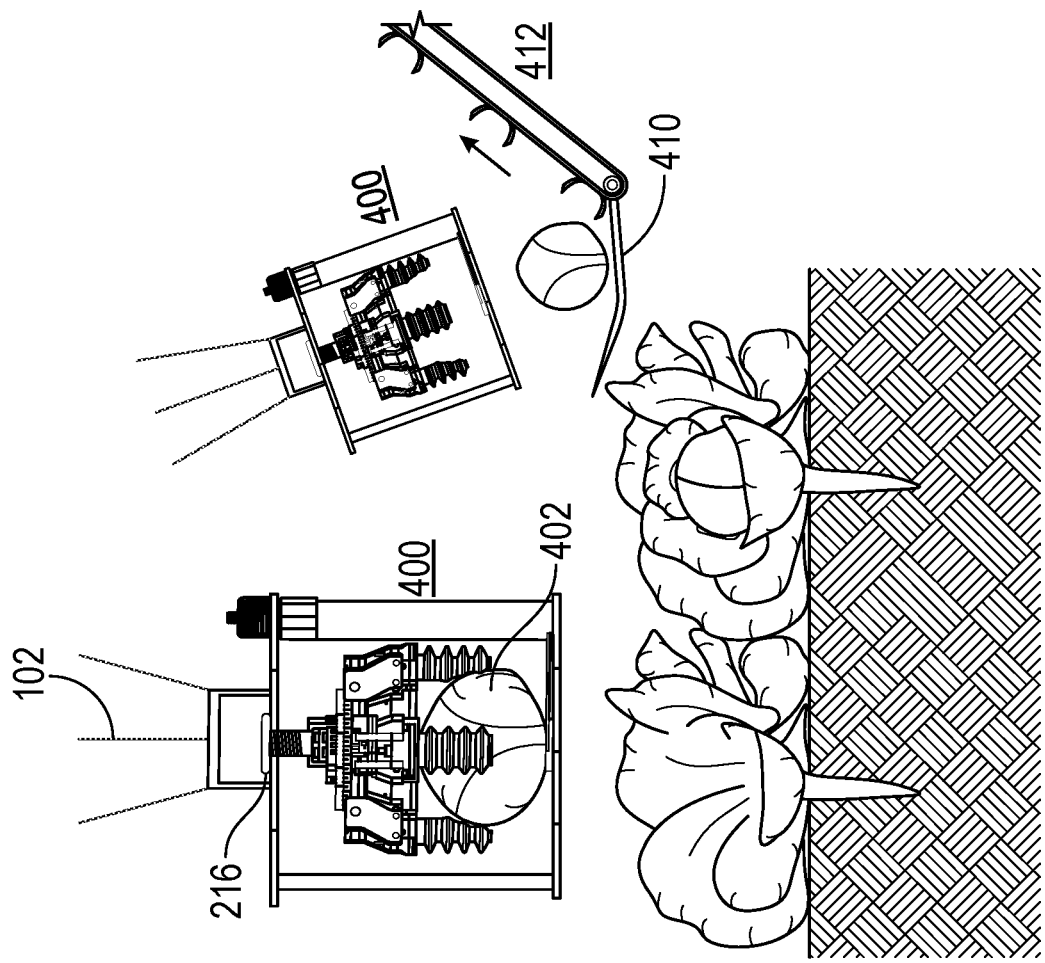
Figure 4B:
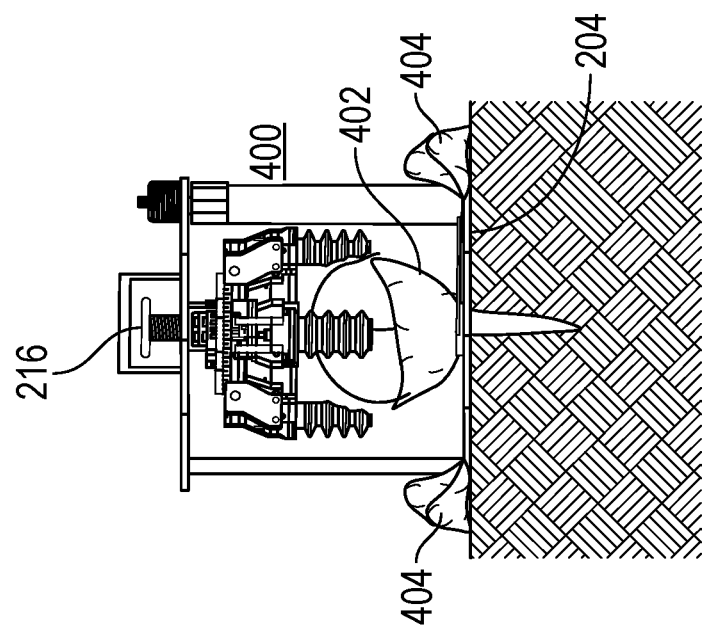

In step 304, the harvester has a cutting and gripping unit that moves, via a robotic arm, over the produce based on the determined location. In some embodiments, the harvester positions the cutting and gripping unit over the produce such that at least part of the produce would be enclosed by the cage-like structure of the cutting and gripping unit once the cutting and gripping unit is lowered. FIG. 4A illustrates a cutting and gripping unit 400 (e.g., cutting and gripping unit 200 of FIGS. 2A and 2B) moved over a produce 402 (e.g., produce 207 of FIGS. 2A and 2B). As shown in FIG. 4A, because the grippers are not yet in contact with the produce, the weight of the grippers causes the stopper 216 to rest flush against the top plate of the cutting and gripping unit. In FIGS. 4A-4C, many supports (e.g., supports 210) of the cutting and gripping unit 400 are not illustrated for clarity.

In step 306, the harvester lowers the cutting and gripping unit. As shown in FIG. 4B, the cutting and gripping unit 400 is lowered such that the produce head is enclosed in the cage-like structure. Further, the ring structure 204 pushes down the outer leaves 404 of the produce to allow access for the blade and to expose the stem or core of the produce for cutting. While the cutting and gripping unit is being lowered, the blade is in a retracted position. As shown in FIG. 4B, as the grippers contact the produce head, upward resistance force from the produce head may cause the grippers to move slightly upward relative to the top plate 201, as shown by the elevated stopper 216.

Figure 7B:
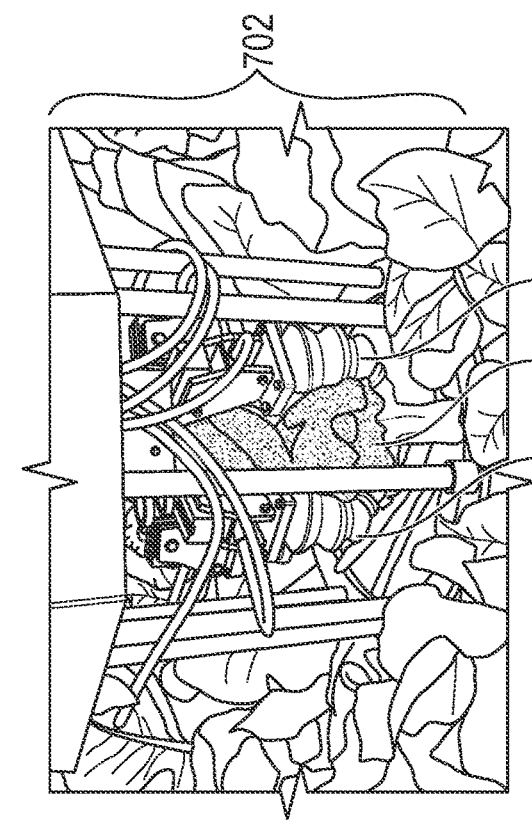
Figure 7C:
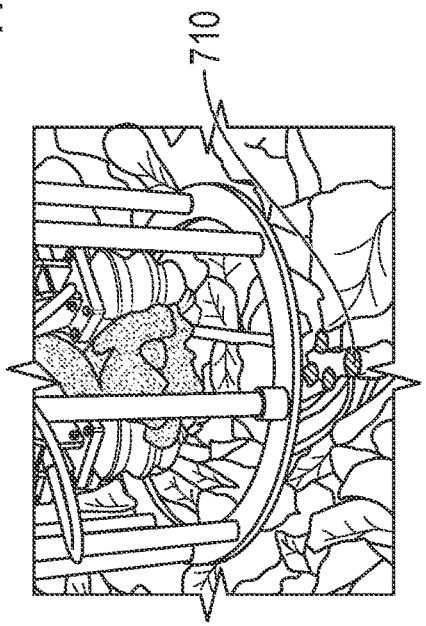
Figure 7A:
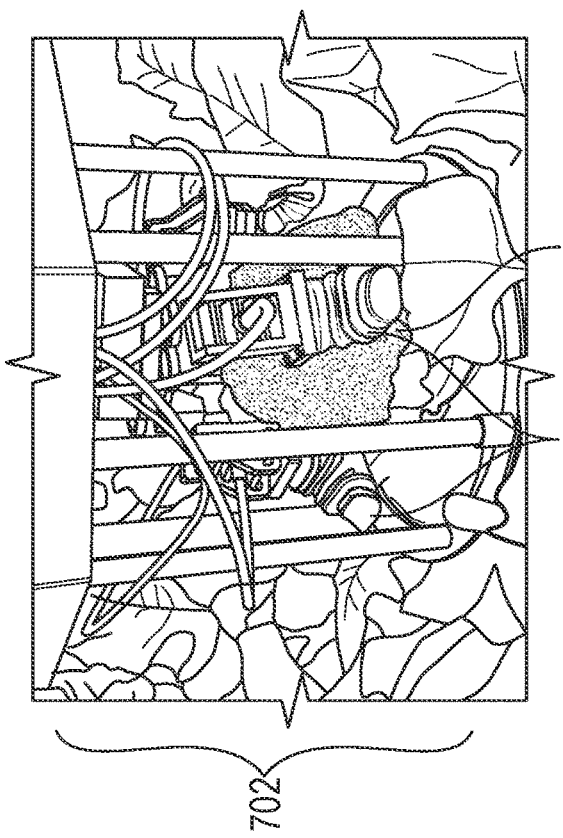

In step 308, the harvester actuates a set of grippers to grab the produce. FIGS. 7A and 7B depict the actuation of a set of exemplary grippers. In FIG. 7A, the cutting and gripping unit 702 has been lowered such that it encloses a broccoli head 706 and the gripper fingers 708 are in contact with the broccoli head 706. The gripper fingers 708 are in a non-actuated state, extending outward from the produce. In FIG. 7B, the set of grippers is actuated such that the gripper fingers 708 curl inward to securely grip the broccoli head 706 and hold it in place. The base ring of the cutting and gripping unit 702 pushes down the outer leaves to allow access for the blade and to expose the stem of the broccoli plant for cutting.

In step 310, the harvester actuates a motor to drive a blade to cut the stem of the produce while the produce is secured by the grippers. The blade is configured to cut the stem located within the cross section of the base ring structure. In some embodiments, the blade automatically retracts after cutting the stem. As shown in FIG. 7C, the cutting and gripping unit 702 is lifted upward via a robotic arm (not depicted) as the grippers remain actuated to securely grip the severed broccoli head 706, thus lifting the severed broccoli head from the ground. As depicted, only the consumable part of the broccoli plant (i.e., the broccoli head) has been harvested, and the outer leaves and the remaining stem 710 are left in the ground. To release the broccoli head, the grippers can be switched to a non-actuated state to relax the gripper fingers.

In some embodiments, the harvester releases the harvested produce onto a conveyer unit, as illustrated in FIG. 4C. As depicted, when the harvester lifts the produce, the weight of the grippers and the harvested produce can cause the stopper 216 to rest flush against the top plate of the cutting and gripping unit 400.

Further, the robotic arms move the cutting and gripping unit 400 over a receiving tray 410 of the conveyor unit 412. The grippers can be switched to a non-actuated state to drop the produce onto the receiving tray. The receiving tray 410 of the conveyor unit 412 is located in proximity to the harvesting site, thus minimizing vertical and horizontal movement of the set of robotic arms 102 needed to deposit the harvested produce. In some embodiments, the receiving tray 410 is located slightly above the unharvested produce in the ground. Accordingly, a harvested produce may be deposited from the cutting and gripping unit 400 onto the conveyor unit 410 without significant lifting.

Figure 5A:
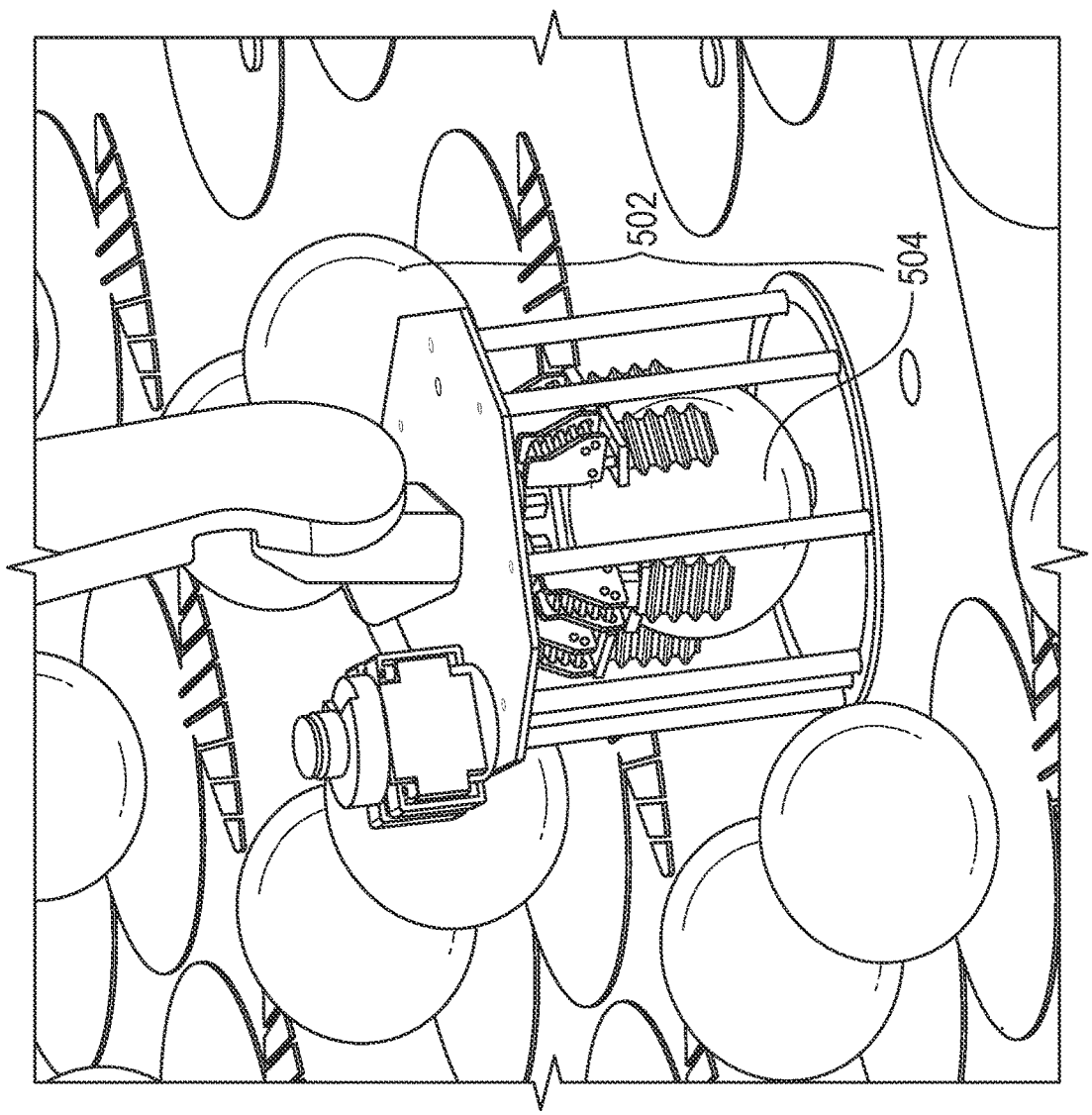
Figure 5B:
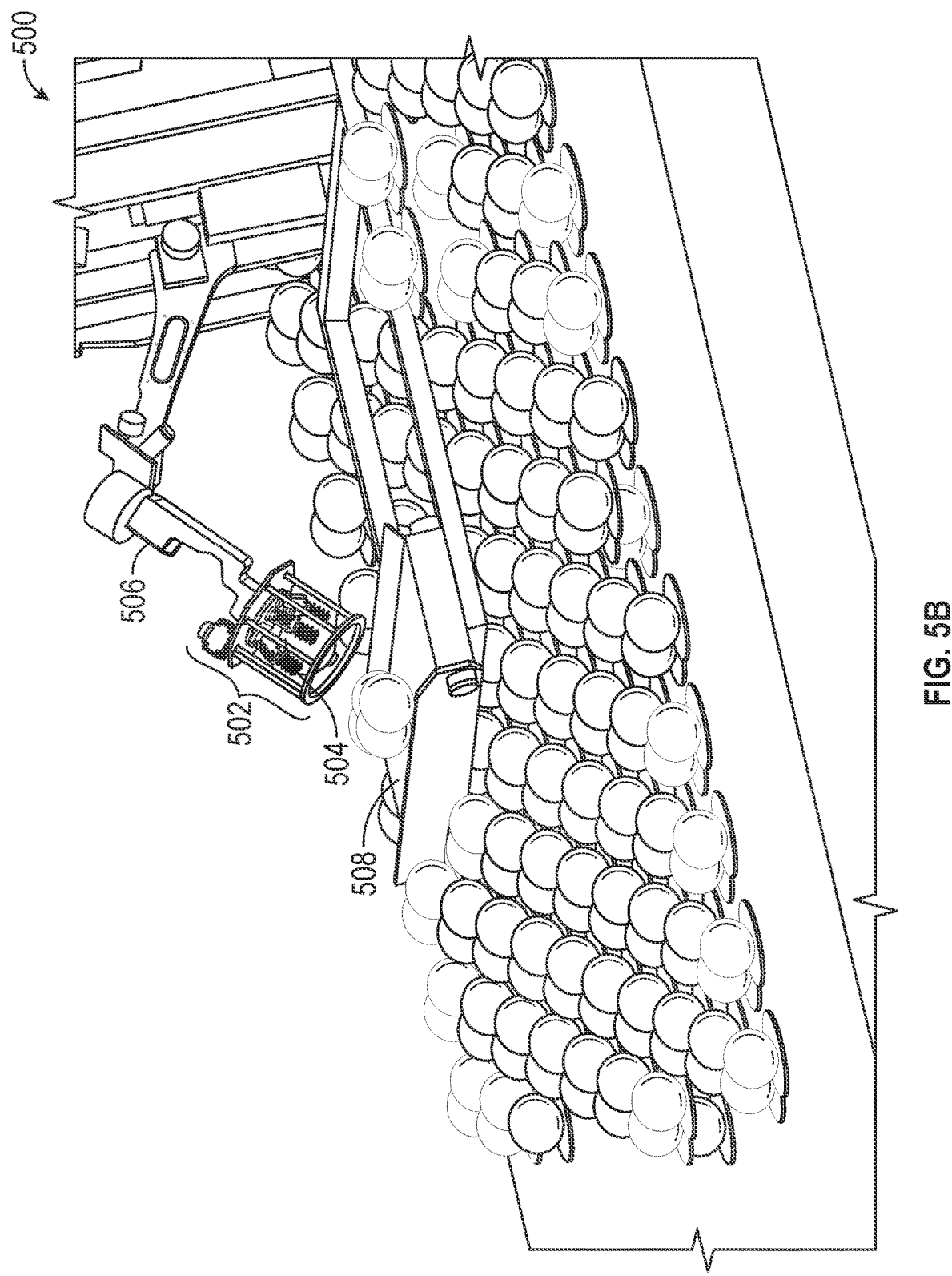

FIGS. 5A-5B illustrate another exemplary process for transporting a harvested produce, in accordance with some embodiments. FIG. 5A depicts a cutting and gripping unit 502 of a harvester lifted upward from the ground as it securely grips the harvested produce 504. FIG. 5B depicts cutting and gripping unit 502 moved via robotic arm 506 to hover over conveyor unit 508, such that the harvested produce 504 can be released from the cutting and gripping unit onto the conveyor unit. In the depicted example, conveyor unit 508 is a flat platform configured to simultaneously hold a plurality of harvested produce.

In some embodiments, a harvester (e.g., harvester 500) may comprise a plurality of sets of robotic arms such that a plurality of produce may be simultaneously located, gripped, cut, and/or deposited onto a conveyor unit. In some embodiments, a plurality of harvesters may be located in the field, and only a subset of the harvesters may comprise conveyor units; thus, a conveyor unit (e.g., platform 508) may be configured to receive harvested produce from a plurality of harvesters. In some embodiments, different cutting and gripping units (e.g., having different sizes) can be attached to the harvester depending on the type of produce to be harvested. In some embodiments, the harvester can determine characteristics of the produce (e.g., via the vision unit) and can select one of the multiple cutting and gripping units to perform the harvesting.

Figure 6B:
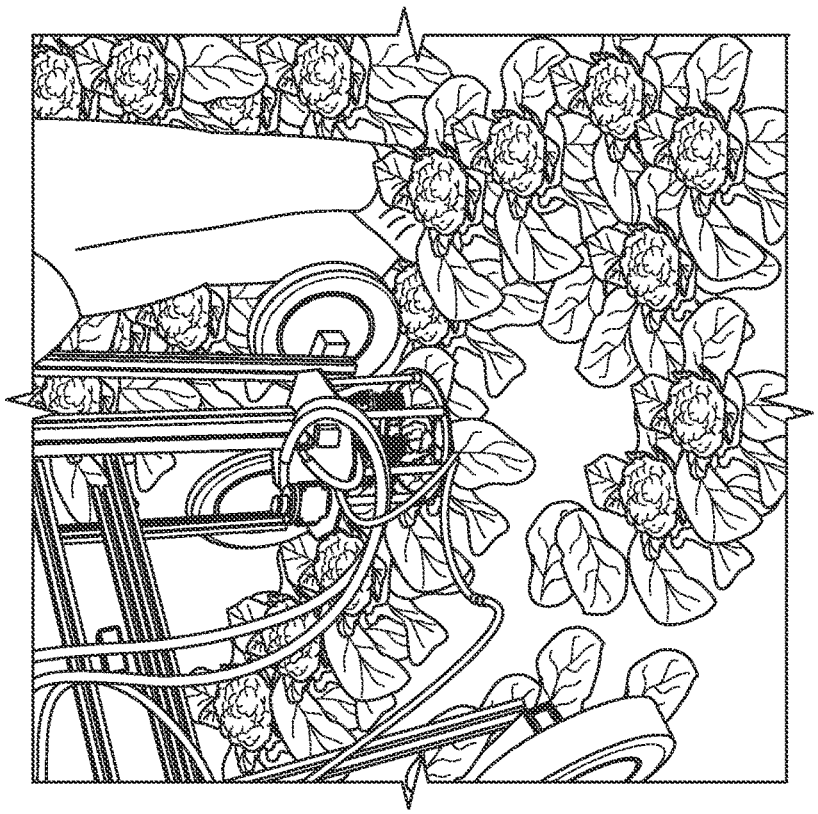
Figure 6A:
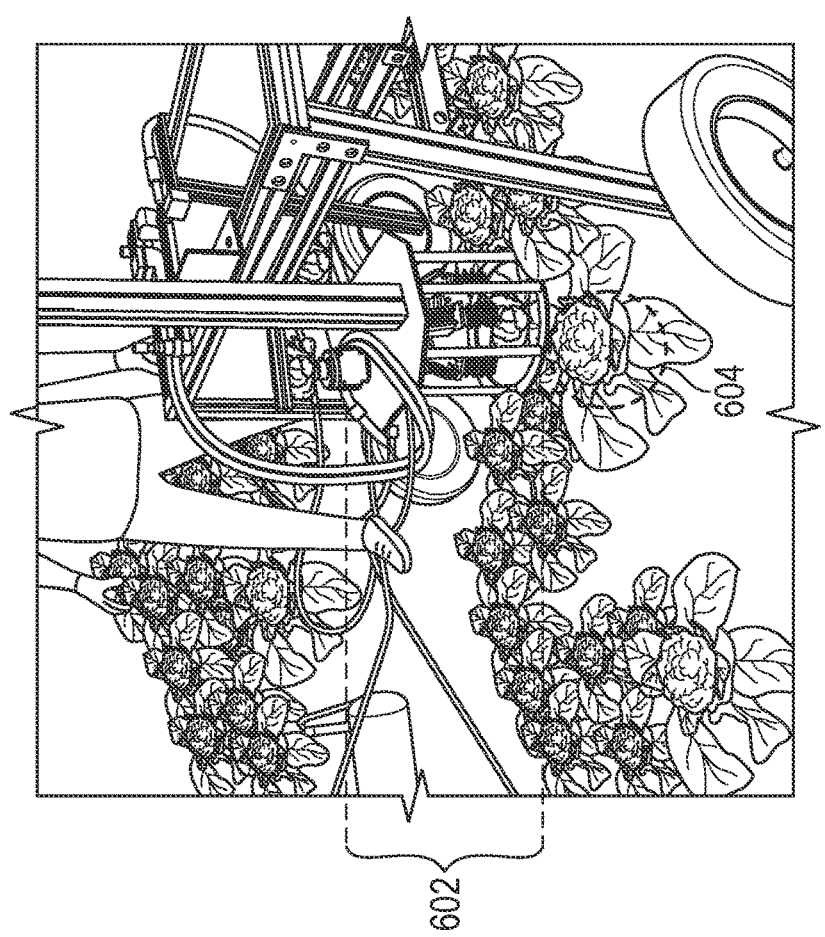

FIGS. 6A-6B illustrate an exemplary harvester in operation, according to some embodiments. FIG. 6A depicts the harvester positioning a cutting and gripping unit 602 of the harvester over a produce 604 (e.g., a lettuce head). FIG. 6B depicts the cutting and gripping unit 602 lowered to enclose a part of the produce 604 such that the stem of the produce can be cut.

Figure 8:
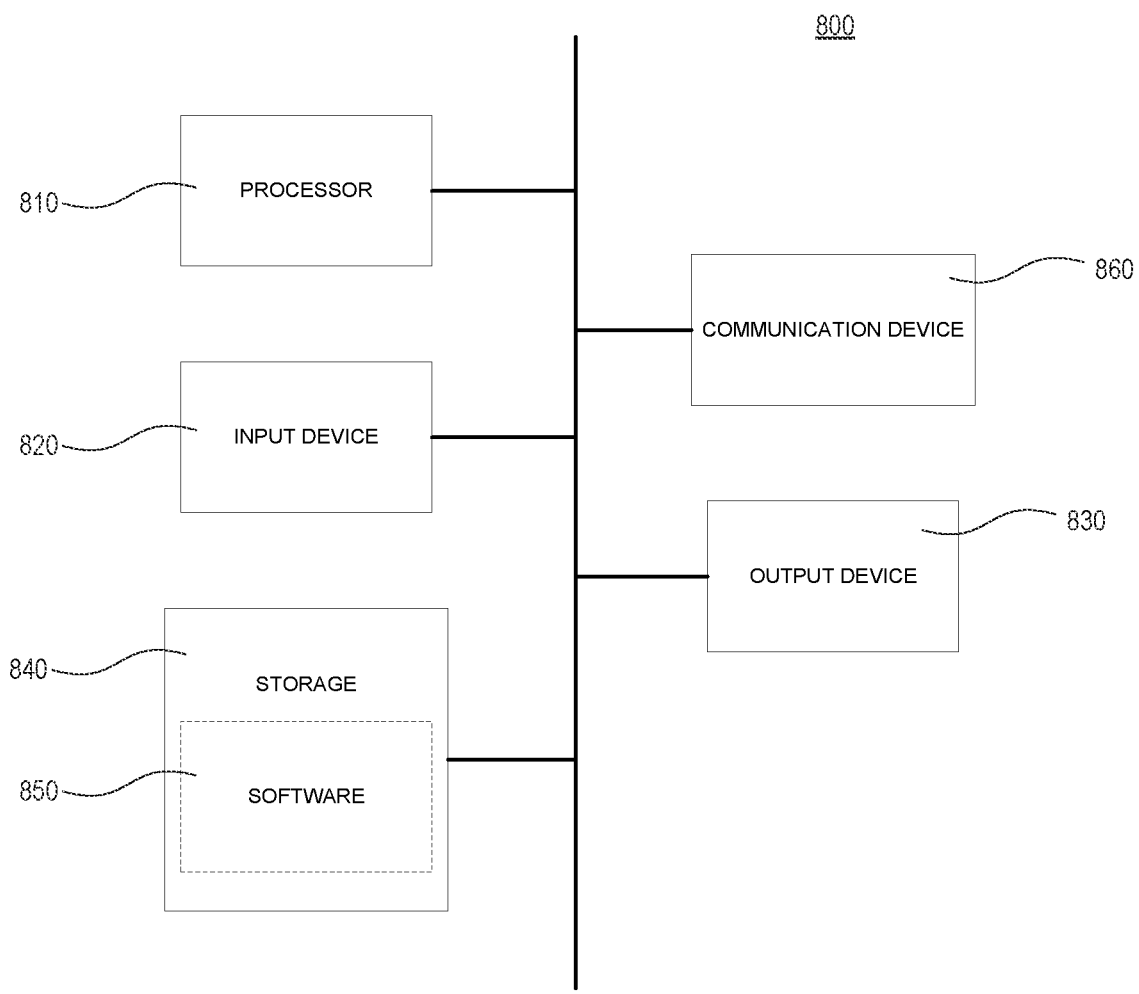
FIG. 8 illustrates an exemplary electronic unit within a harvester, according to some embodiments.

The operations described above with reference to FIGS. 1-7B are optionally implemented by components depicted in FIG. 8.

FIG. 8 illustrates an example of a computing device in accordance with one embodiment. Device 800 can be a host computer connected to a network. Device can be a client computer or a server. As shown in FIG. 8, device 800 can be any suitable type of microprocessor-based device, such as a personal computer, workstation, server or handheld computing device (portable electronic device) such as a phone or tablet. The device can include, for example, one or more of processor 810, input device 820, output device 830, storage 840, and communication device 860. Input device 820 and output device 830 can generally correspond to those described above, and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic or optical memory including a RANI, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Figure 9:
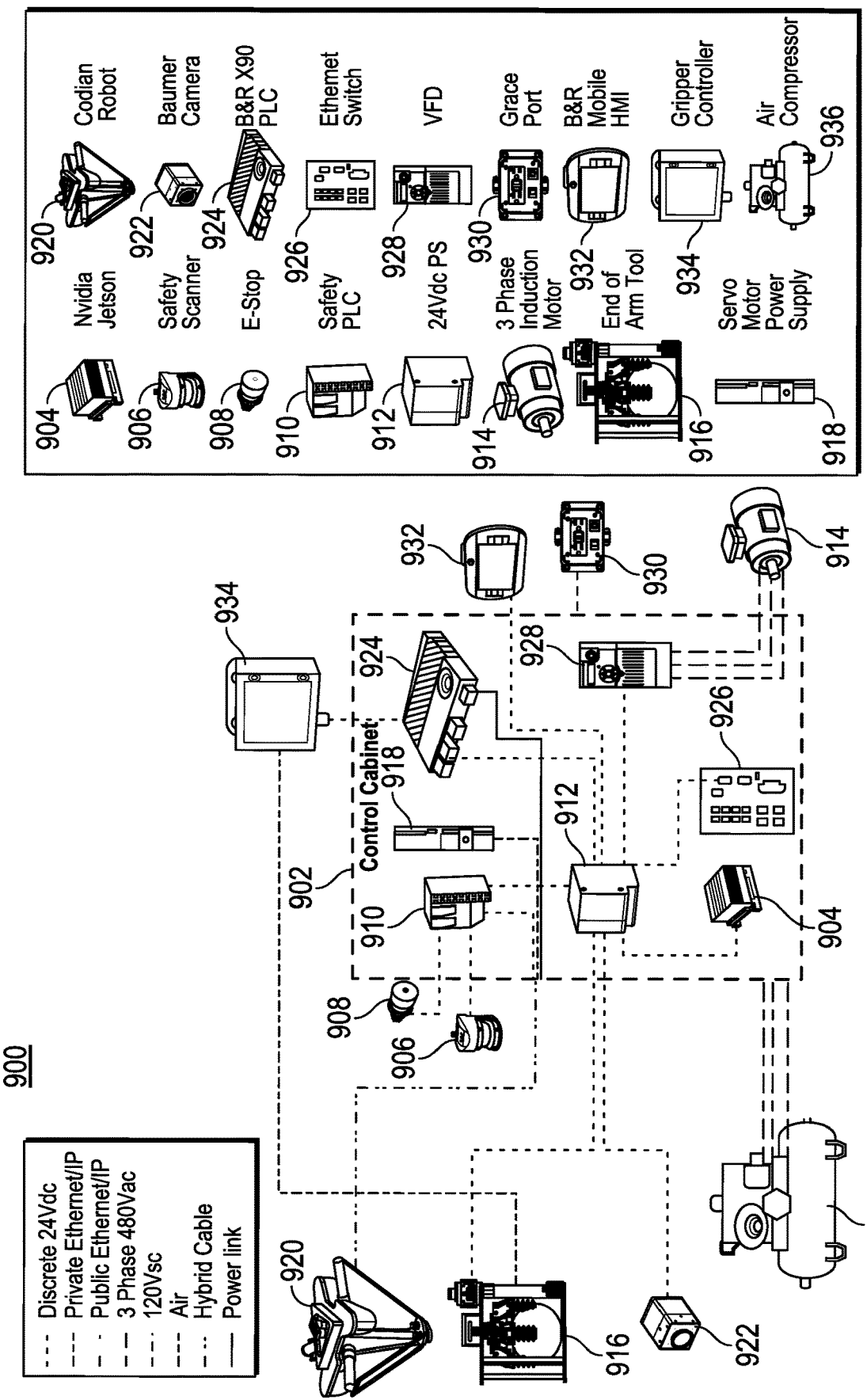
FIG. 9 illustrates an exemplary implementation of a harvester, according to some embodiments.

FIG. 9 illustrates an exemplary implementation of a harvester 900, in accordance with some embodiments. With reference to FIG. 9, the harvester comprises a control cabinet 902. The control cabinet 902 can be positioned on top of a chassis of the harvester (e.g., chassis 108 of FIG. 1). In some embodiments, the control cabinet comprises a housing (e.g., a metal housing, a plastic housing) that encloses a plurality of components such as a programmable logic controller 924 (e.g., B&R X90 PLC), a motor power supply 918 (e.g., servo motor power supply), a safety PLC 910, a power supply 912 (e.g., 24 Vdc power supply), a processing unit 904 (e.g., a NVidia Jeston processing unit), an Ethernet Switch 926, and a variable-frequency drive 928.

The control cabinet can be communicatively coupled to a plurality of external components, such as one or more control switches 908 (e.g., E-stop), a safety scanner 906, robotic arm(s) 920 (e.g., the above-described robotic arms), an end-of-arm tool 916 (e.g., the above-described gripping and cutting unit), a camera 922, an air compressor 936, a motor 914 (e.g., induction motor), communication portals 930, an operator panel 932 (e.g., B&R mobile HMI), and a gripper controller 934 according to the exemplary power layout depicted in FIG. 9.

In some embodiments of the harvester and methods described herein, the produce is a vegetable or fruit that predominantly has a round or domed shape (e.g., that would fit within the ring-like structure of the gripping mechanism described herein). In some variations, the produce is lettuce, cabbage, cauliflower, broccoli, and artichoke. In one variation, the produce is iceberg lettuce. In another variation, the produce is romaine lettuce.

Exemplary methods, non-transitory computer-readable storage media, systems, and electronic devices are set out in the following items:

1. A harvester for harvesting a produce planted in a field, comprising:
   a cutting and gripping unit, comprising:
      a top frame;
      a base ring structure;
      a plurality of supports arranged in a circular configuration to form a cage-like structure, wherein proximal ends of the plurality of supports are affixed to the top frame and distal ends of the plurality of supports are affixed to the base ring structure;
      a set of grippers connected to the top frame; and
      a blade rotatably connected to the base ring structure, wherein the blade is configured to cut the produce while at least a part of the produce is enclosed within the plurality of supports and secured by the set of grippers. \

2. The harvester of item 1, wherein the base ring is configured to push outer leaves of the produce downward to expose a stem of the produce for cutting.

3. The harvester of item 1 or 2, further comprising a motor configured to drive the blade to cut the produce.

4. The harvester of item 3, wherein the motor is positioned adjacent to the blade.

5. The harvester of item 3, wherein the motor is positioned adjacent to the top frame.

6. The harvester of any one of items 1 to 5, further comprising a robotic arm configured to move the cutting and gripping unit.

7. The harvester of any of items 1-6, wherein the set of grippers is configured to move up and down relative to the top frame.

8. The harvester of item 7, further comprising a shaft extending through the top frame,
   wherein a distal end of the shaft is connected to the set of grippers and the proximal end of the shaft comprises a stopper, and
   wherein the stopper is enclosed in a bracket affixed to the top frame.

9. The harvester of any of items 1-8, further comprising a vision unit, wherein the vision unit comprises at least one camera, and wherein the harvester is configured to position the cutting and gripper unit over the produce via the robotic arm.

10. The harvester of any one of items 1 to 9, further comprising a control unit configured to actuate the set of gripers and the blade.

11. The harvester of any one of items 1 to 10, further comprising a conveyor unit configured to transport the harvested produce to a storage or processing area.

12. The harvester of any one of items 1 to 11, further comprising a chassis, wherein the cutting and gripping unit is connected to the chassis.

13. A method for harvesting a produce planted in a field using a harvester, wherein the harvester comprises a cutting and gripping unit, comprising: a top frame; a base ring structure; a plurality of supports arranged in a circular configuration to form a cage-like structure, wherein proximal ends of the plurality of supports are affixed to the top frame and distal ends of the plurality of supports are affixed to the base ring structure; a set of grippers connected to the top frame; and a blade rotatably connected to the base ring structure; the method comprising:
   determining a location of the produce;
   positioning a harvester based on the determined location of the produce;
   lowering the harvester to enclose at least a portion of the produce within cage-like structure;
   securing the produce via the set of grippers; and
   activating the blade to cut the produce while the produce is secured via the set of grippers.

14. The method of item 13, wherein the location of the produce is determined by a vision system of the harvester.

15. The method of any of items 13-14, further comprising: pushing down, via the base ring structure, outer leaves of the produce to expose a core or stem of the produce for cutting.

16. The method of any of items 13-14, further comprising: lifting the cutting and gripping unit while gripping the cut produce via the set of grippers.

17. The method of item 16, further comprising: de-actuating the grippers to deposit the cut produce onto a conveyor unit.

18. The method of item 17, further comprising: transporting, via the conveyor unit, the cut produce to a storage or processing area.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A harvester for harvesting a produce planted in a field, comprising:
   a cutting and gripping unit, comprising:
      a top plate;
      a base ring structure;
      at least three supports arranged in a circular configuration to form a cage-like structure, wherein proximal ends of the plurality of supports are directly affixed to the top plate and distal ends of the plurality of supports are directly affixed to the base ring structure;
      a set of grippers connected to the top plate, the set of grippers configured to come into contact with the produce after the cage-like structure encloses at least a portion of the produce;
      a blade mounted to the base ring structure and rotatably connected to the base ring structure, wherein the blade is configured to cut the produce while at least a part of the produce is enclosed within the plurality of supports and secured by the set of grippers; and
      a shaft extending through the top plate comprising:
         a distal end connected to the set of grippers and
         a proximal end comprising a stopper, wherein the stopper is enclosed in a bracket affixed to the top plate.

2. The harvester of claim 1, wherein the base ring is configured to push outer leaves of the produce downward to expose a stem of the produce for cutting.

3. The harvester of claim 1, further comprising a motor configured to drive the blade to cut the produce.

4. The harvester of claim 3, wherein the motor is positioned adjacent to the blade.

5. The harvester of claim 3, wherein the motor is positioned adjacent to the top plate.

6. The harvester of claim 1, further comprising a robotic arm configured to move the cutting and gripping unit.

7. The harvester of claim 1, wherein the set of grippers is configured to move up and down relative to the top plate.

8. The harvester of claim 6, further comprising a vision unit, wherein the vision unit comprises at least one camera, and wherein the harvester is configured to position the cutting and gripper unit over the produce via the robotic arm.

9. The harvester of claim 1, further comprising a control unit configured to actuate the set grippers and the blade.

10. The harvester of claim 1, further comprising a conveyor unit configured to transport the harvested produce to a storage or processing area.

11. The harvester of claim 1, further comprising a chassis, wherein the cutting and gripping unit is connected to the chassis.

12. A method for harvesting a produce planted in a field using a harvester, wherein the harvester comprises a cutting and gripping unit, comprising: a top plate; a base ring structure; at least three supports arranged in a circular configuration to form a cage-like structure, wherein proximal ends of the plurality of supports are directly affixed to the top frame and distal ends of the plurality of supports are directly affixed to the base ring structure; a set of grippers connected to the top plate, the set of grippers configured to come into contact with the produce after the cage-like structure encloses at least a portion of the produce; a blade mounted to the base ring structure and rotatably connected to the base ring structure; and a shaft extending through the top plate comprising: a distal end connected to the set of grippers and a proximal end comprising a stopper, wherein the stopper is enclosed in a bracket affixed to the top plate; the method comprising:

determining a location of the produce;

positioning a harvester based on the determined location of the produce;

lowering the harvester to enclose at least a portion of the produce within the cage-like structure;

after enclosing at least the portion of the produce within the cage-like structure, securing the produce via the set of grippers; and activating the blade to cut the produce while the produce is secured via the set of grippers.

13. The method of claim 12, wherein the location of the produce is determined by a vision system of the harvester.

14. The method of claim 12, further comprising: pushing down, via the base ring structure, outer leaves of the produce to expose a core or stem of the produce for cutting.

15. The method of claim 12, further comprising: lifting the cutting and gripping unit while gripping the cut produce via the set of grippers.

16. The method of claim 15, further comprising: de-actuating the grippers to deposit the cut produce onto a conveyor unit.

17. The method of claim 16, further comprising: transporting, via the conveyor unit, the cut produce to a storage or processing area.

* * * * *